June 25, 1957    A. I. McFARLAN    2,796,740
AIR CONDITIONING SYSTEM
Filed Sept. 26, 1955
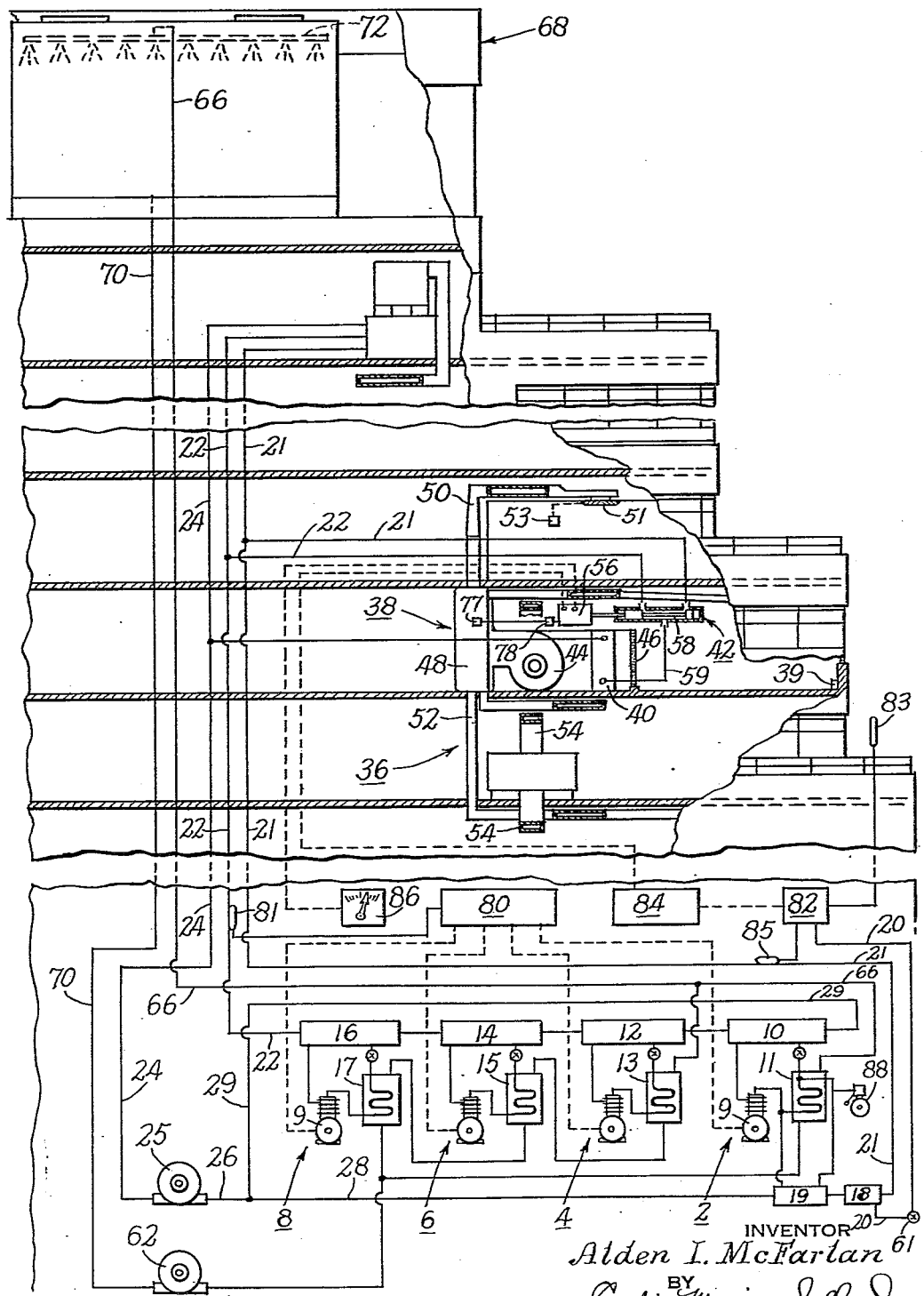
INVENTOR
Alden I. McFarlan
BY
Curtis Morris + Safford
ATTORNEYS United States Patent Office 2,796,740
Patented June 25, 1957

2,796,740

AIR CONDITIONING SYSTEM

Alden I. McFarlan, Westfield, N. J.

Application September 26, 1955, Serial No. 536,513

16 Claims. (Cl. 62—6)

This invention relates to air conditioning, and more in particular, to a heating and cooling system for a multiple zone building.

An object of this invention is to provide an improved heating and cooling system. Another object is to provide a refrigeration system which is adapted to extract heat from one zone and to deliver heat to another, and which includes auxiliaries for dissipating excess heat from the system and for adding heat to the system when the supply within the system is insufficient. A further object is to provide for improved control of the heating and cooling operations of systems of the nature referred to above. A further object is to provide systems of the above nature which are inexpensive to manufacture and maintain efficient in operation and which occupy minimum space.

These and other objects will be in part obvious and in part pointed out below.

In the drawing, the single figure is a somewhat schematic representation of a system constituting one embodiment of the invention.

In the illustrative embodiment of the invention, the system includes arrangements for heating and cooling the air in a plurality of zones, in this case, the different floors of a building. The heating and cooling are performed by supplying streams of hot and cold water to the various zones, and automatic means is provided to selectively deliver hot water or cold water, or a mixture of the two, to each zone in the quantity necessary to perform the desired heating or cooling function.

In this embodiment of the invention, the system includes four separate refrigeration systems or stages 2, 4, 6, and 8 having evaporator-chillers 10, 12, 14 and 16 which are direct-expansion water chillers. Each of these refrigeration systems includes a compressor 9, and the systems have condensers 11, 13, 15 and 17, respectively. An auxiliary condenser 19 has its refrigerant circuit connected in parallel with condenser 11, and it has its water circuit connected in a hot water line 21. Downstream in this line 21 there is a water heating unit or converter 18 which may receive steam through a line 20 and is adapted to further heat the water flowing in line 21 after the water has passed through condenser 19 for the initial heating.

The water circuits of the evaporator-chillers 10, 12, 14 and 16 are connected respectively in series, and the water flows from the last of them through a cold water line 22. This cold water line 22 and the hot water line 21 are heat insulated and they extend together to the various zones of the conditioned space. Within each of these zones there is a coil for heating or cooling air, and a controlled amount of hot or cold water, or a mixture of hot and cold water, flows through each of these coils and the water from all of the coils returns from these zones through a water line 24. The water from line 24 is received by a pump 25 and is discharged from the pump through a line 26. From line 26 the water flows either through a line 28 extending to auxiliary condenser 19 and the hot water line 21, or through another line 29 extending to the evaporator-chiller 10 of the first stage 2 and thence through the other evaporator-chillers to the cold water line 22.

It has been indicated above that the hot and cold water lines 21 and 22 extend to the various zones of the conditioned space, and that the water which is utilized for cooling and heating is returned from these zones through the return line 24. The illustrative embodiment of the present invention is in an office building with a large number of floors, groups of which constitute the various zones of the conditioned space. The equipment in one zone will be described, and the equipment in the other zones is similar or identical, except to the extent as pointed out. Upon the two central floors of each zone there are two separately operated units, a unit 36 which supplies conditioned air to the interior spaces of the floors of that zone, and directly above unit 36 there is a similar unit 38 which supplies conditioned air to the exterior spaces of that zone. In addition to these two units, the entire peripheral wall of the building has at each floor a baseboard radiator 39 to which hot water is supplied for heating.

Units 36 and 38 are identical in general mode of operation, but they may be of different sizes and they have different duct systems leading from them. Illustratively, each of units 36 and 38 is supplied with a mixture of 25% fresh air and 75% return air which is withdrawn from the spaces to which it delivers air. Each unit 38 includes a heating and cooling coil 40 to which a stream of the hot or cold water, or a mixture of the two, is supplied through a throttling and mixing valve 42 from the hot and cold water lines 21 and 22. A fan 44 draws the air through a set of filters 46 and thence through the heating or cooling coil 40, and the air is discharged into a duct or chamber 48. The conditioned air passes from duct 48 upwardly and downwardly through distribution duct systems 50 and 52, respectively, and through volume control air diffusers 51 to the various zones. The volume of air to each zone is controlled by a thermostat 53 within that zone to maintain the desired temperature. As will be pointed out below, this also provides adequate humidity control. Unite 36 is not shown in detail, but is similar, except that it has its own distribution duct system indicated at 54.

The valve member 58 of valve 42 has a central position in which it supplies a mixture of the hot and cold water at a set temperature and of constant volume through a line 59 to coil 40. A temperature-responsive controller 56 moves the valve member from this central position in response to changes in the temperature of the air flowing from coil 40, thus to maintain a desired "leaving air" temperature from the coil. Hence, as the air temperature rises so that increased cooling is called for, the valve supplies increasing amounts of cold water and decreasing amounts of hot water to the coil, but the volume of flow remains constant. Conversely, when increased heating is called for, the drop in the air temperature moves the valve member in the opposite direction to supply increased amounts of hot water to the coil and to decrease the supply of cold water, and the volume still remains constant. When the valve member is moved to the right so that the valve is fully opened for the flow of maximum hot water to the coil, and there is still a demand for increased heating, the controller 56 acts to increase the water temperature in a manner explained more fully below.

It has been indicated above that the condensers of the four refrigeration systems are cooled by water which is circulated to a cooling tower on the roof. This water circulation is provided by a pump 62, the water flowing through the condensers and thence through a line 66 to a cooling tower 68. The cooled water is returned from the tower through a line 70. Tower 68 has a water spray assembly 72, and it is provided with air circulating fans.

Certain interior spaces in the building require cooling throughout the year, but the peripheral spaces require cooling during the hot season and heating during the cool season. During a major portion of the year there may be sudden and extreme changes in the outside air temperature so as to require cooling within a certain zone for a portion of the day, and require heating within that zone for another portion of the day. For example, in the early morning all of the zones may require heating, whereas later in the day some will require heating and others cooling. Also, there may be a substantial amount of peripheral space which requires heating, while the remainder of the conditioned space requires cooling during the entire period of occupancy.

The system herein disclosed provides fully automatic control so as to regulate the temperature within each zone at all times, and the heat which is extracted from the space being cooled plus the heat gained from the compressor is delivered to the space being heated to the extent that heat is required. When the heat extracted from the space being cooled is greater than that required to heat the other spaces, then the excess heat is dissipated through a cooling tower. When the demand for heat exceeds that which is available from the conditioned space, then additional heat is added by supplying steam to the converter 18.

The condensers of the system are water cooled by a separate stream of water which, in turn, is cooled in the evaporative cooling tower. These condensers have cleanable water tubes so that any contamination which is picked up by the water in the cooling tower and then lodged in the condensers may be readily removed. However, it should be noted that the "heat pump" heating of water for use in supplying heat to the building from the refrigeration system is carried on in the auxiliary condenser 19 so that the water which is circulated through the building through lines 21, 22, and 24 does not pass through the condensers 11, 13, 15 and 17; and, water from the cooling tower does not circulate through condenser 19. In this way, contamination from the water tower is prevented from entering the heating and cooling water system of the building.

It should be noted that all of the water which is circulated to the heat transfer coils in the various zones of the conditioned space is returned through the single water return line 24. With this operation, one or more of these heat transfer coils may be supplied with cold water, while the remaining coils are supplied with hot water; or, any of the coils may be supplied with a mixture of hot and cold water. Each of the coils is supplied with a constant stream of hot or cold water, or a mixture of the two, through its throttling valve, and the temperature of the water flowing through each coil depends upon the amount of cooling or heating which is required for the zone of that coil.

The "deep" coils, that is, coils providing something in the orders of 20° to 25° temperature change for the water with design load conditions, give a very advantageous result with the three-pipe system of the illustrative embodiment. That is, when the system is operating to provide heating in some zones and cooling in others, the temperature of the water from the heating coils will be somewhat near the temperature of the water from the cooling coils. Therefore, the system is more efficient than it would be if the system had standard shallow coils with less change in the water temperature so that the water passing from one of them acting as a heating coil would be at a higher temperature, and the water passing from one of them acting as a cooling coil would be cooler. If the present system were provided with the standard shallow coils, relatively hot water would be mixed with relatively cold water in line 24. Whereas, the coils 40 always deliver water of somewhat near the same temperature at all times regardless of whether the coils are heating or cooling.

The "deep" coils also tend to deliver air which is substantially saturated whenever there is a cooling load, and the air is delivered to the various zones through distributors which are thermostatically controlled so as to deliver the volume of air necessary to maintain the desired temperature. Hence, the humidity is controlled within each of the zones by merely regulating the dry bulb temperature of the cold air and the volume of air, and no humidity responsive controller is necessary because the dry bulb and wet bulb temperatures are the same, or substantially the same, for the saturated cold air.

This system also has the basic advantage that no heat is wasted as long as any heat is needed within the building. For example, if the operating conditions are such that steam heat is being added to the system at a fairly rapid rate and the demand for heat is reduced below that necessary for supplemental heat, the steam supply is turned off and the heating load may be carried by the heat from condenser 19 which is extracted from the internal spaces. In this particular embodiment of the invention, the relative amounts of external and internal spaces and the anticipated mode of operation make it desirable to provide for reverse cycle heating from only one of the refrigeration stages, although the invention contemplates that reverse cycle heating could be provided from all of the stages. A single stage 2 provides cooling for all of the internal spaces when the outside temperature is relatively low so that the outside spaces require no cooling. Hence, the heat from the internal spaces is delivered to the hot water through the auxiliary condenser 19, and is utilized in heating the external spaces.

In the illustrative embodiment of the present invention, the cooling of the water in line 21 is staged, and the stages 2, 4, 6 and 8 operate at progressively lower suction temperatures in their evaporators and progressively higher temperatures in their condensers. Illustratively, the suction Fahrenheit temperatures of these stages are respectively 56°, 49°, 43° and 38°, and the condensing temperatures are 100°, 101.7°, 103.3°, and 105°. Assuming that water is passing to stage 2 at 74°, it leaves this stage at 66°, and in the second stage 4 this temperature is dropped to 59°. In the third stage 6 the water temperature is dropped to 53°, and in the fourth stage 8 the water temperature drops to 48°.

With the staged operation of the compressors, the efficiency is increased materially so that the compressors require not more than three-quarters horsepower per ton of refrigeration with New York city designed conditions, and this is a reduction of at least 25% below the accepted standards of power consumption at peak loads. The system also includes automatic starting, stopping and unloading for the compressors to maintain high efficiency of operation at less than peak loads. During the cold season, when only the internal spaces require cooling, the motors for the out-of-service compressors are disconnected from the line, and this reduces the energy and demand charges. In the illustrative embodiment, the four compressors of 100 H. P. rating each perform 600 tons of refrigeration. If a 600 H. P. compressor were provided instead of these four 100 H. P. compressors, the energy and demand charges would be in the order of $300 to $750 per month. However, by disconnecting one, two or three of the compressor motors, the energy and demand charges are tremendously reduced.

The heating control is fully automatic at all times. A time clock maintains a reduced temperature at night, but raises the temperature shortly prior to the time of occupancy. The turning on of the lights in the inside area provides a substantial heat load. Hence, the internal cooling system is turned on automatically when the lights are turned on, but heating is provided when the lights are off.

The first stage 2 is operated as a heat pump to cool the internal spaces and heat the external spaces during the cold season. This permits the removal of the cooling tower completely from service during the entire cold season and avoids the normally accepted problems attendant to operating the cooling tower at that time. For example, if the cooling tower is operated during a time when there may be a drop in night temperature below freezing, the tower must be drained every night and the maintenance and cleaning of the tower during the cold season represents a substantial cost. As an additional feature, an enclosed tank may be provided on an upper floor of the building to which the water is drained from the tower sump tank or pan during seasons when the tower may be used at certain times of the day and yet the outside temperature occasionally drops below freezing. By draining the water from the tower to the enclosed tank, the water is maintained above freezing. The present system provides complete freedom from all of the prior difficulties and expenses during the cold season.

In the illustrative embodiment of the present invention, each of the throttling and mixing valves 42 provides a constant flow of water through its coil at all times, and it mixes hot and cold water to supply its coil with water at the required temperature. Hence, a constant volume of water is circulated through the entire system by the circulating pump 25. Under some conditions, the valves 42 are replaced by throttling valves which do not mix hot and cold water, but supply hot or cold water alternatively to the various coils. Each such valve has a central position in which no water flows through its coil. When moved in one direction from this central position, the valve supplies cold water at an increasing rate, and when moved in the other direction, the valve supplies hot water at an increasing rate. Each of these valves has an air unit or end switch which controls the supplying of steam to the converter 18. The pump 25 is a constant volume pump and when valves 42 are replaced by throttling valves with a central "off" position in which no water flows, the system must be provided with a by-pass line through which water flows when the full capacity of the pump is not flowing through the system. Accordingly, under such circumstances, the by-pass line extends from line 22 to line 24 and has a pressure relief valve therein which opens to permit water to flow therethrough. The flow through this by-pass line is of sufficient volume at all times to permit pump 25 to handle its full capacity regardless of the amount of water that is flowing through lines 21 and 22 and the various coils of the system.

The system herein disclosed is fully automatic during normal operation, but manual control may be interposed to compensate for the regular and irregular deviations in load conditions and modes of operation. The automatic control system in the illustrative embodiment is an air pressure system where compressed air at a pressure of 15 pounds per square inch is supplied to various of the control units and elements. These various control units and elements are then opened to permit air under controlled pressure to flow to the various operating elements and units of the control system. The invention contemplates that equivalent electrical control units and elements may be used in place of certain of the air-operated units, or the entire control system may be electrical. The system includes:

The throttling and mixing valve 42 discussed above for each of the units 36 and 38;

The temperature responsive controller 56 for each of the valves 42. Each controller 56 has a temperature-sensing bulb 77 in the air discharge chamber for its unit and an off-and-on controller 78 which renders its controller 56 inoperative whenever the fan for that unit is not operated;

A central recorder-controller 80 which controls the refrigeration units and maintains a constant cold water temperature in line 22, and having a sensing bulb 81;

A recorder-controller 82 which maintains the desired hot water temperature in line 21, and having a temperature sensing bulb 85, and this temperature is varied inversely proportional to the temperature of the outside air as indicated by a bulb 83;

A unit 84 which is connected through an air line to the controller 56 for each of the valves 42, and is adapted to modify the operation of controller 82 to raise the temperature of the hot water when any one of the valves 42 is fully open for the flow of hot water and yet the demand for heating has not been satisfied;

A remote temperature controller 86 which is located upon the control panel and which may be operated at any time to modify the operation of each of the controllers 56 to provide for rapid heating up of the building in winter or rapid cooling of the building in summer, for example, in the morning when the building has been unoccupied and its temperature is abnormally low or high; and, An alarm bell 88 which sounds when the temperature at the auxiliary condenser exceeds a predetermined value indicating that the heating load is not sufficient to dissipate all of the heating resulting from the cooling load, and that the operator must place the cooling tower into operation to dissipate the excess heat.

The central recorder-controller 80 has control lines extending to each of the compressors, and it automatically maintains the desired temperature of the cold water. The refrigeration system 8 is operated continuously whenever the building is occupied. This provides the basic cooling for the internal space, and it provides heat for marginal heating of the external space. Whenever there is a substantial cooling load, the additional refrigeration systems or stages are turned on in succession. In this particular system, cold water is maintained at a temperature of 52° F. for peak load operation. However, under some conditions of operation, this temperature may be reduced to 45° F. One such condition would be if the outside temperature is not particularly high, but the humidity is high. Then the cold water temperature is reduced so as to give substantial dehumidification, and the room temperature may then be maintained at 72° F. The recorder-controller 80 also provides a record of the temperatures of the cold water flowing through line 22, and the return water in line 24.

The recorder-controller 82 records and controls the temperature of the hot water flowing through line 21, with the control being exerted through the valve 61 which is opened and closed to supply more or less steam to the converter 18. Controller 82 is responsive to a demand for additional heating by the control unit for any one of the valves 42. Hence, for example, if one of these valves is supplying a maximum amount of hot water to its coil, and the demand for heating by that coil is still unsatisfied, controller 82 is caused to increase the water temperature.

Under some circumstances, the recorder-controller 80 is provided with a "re-set" control so that the temperature of the cold water is modified in accordance with the outside temperature, or in accordance with the demand for dehumidification within any of the cold spaces. For example, the recorder-controller may be provided with an outside sensing bulb of the compensating type so as to raise the general temperature level when the outside temperature rises abnormally. Humidistats may also be provided which reset the controller 80, and lower the temperature of the cold water in response to a demand for dehumidification in any one of the conditioned spaces.

When the central recorder-controller 80 maintains different water temperatures as the outside temperature varies, the inside room temperature may be maintained at 80° on a warm day, with a cold water temperature of 52°, whereas on a colder but humid day, the inside temperature may be maintained at 72°, with a water temperature of 45° to 48°. The higher temperature for the cold water produces economy in operation which permits greater tonnage of cooling during peak loads, that is, when the outside temperature is highest. This control effect may be obtained manually by utilizing the remote temperature controller 86. For example, the operator may use this controller as indicated above for rapid cooling of the building in summer, and also for reducing the temperature of the air flowing from the coils when the outside temperature is relatively low and the humidity is high. This particular controller is also adapted to provide a relatively high cold-air temperature when the outside temperature is high, and the inside air temperature is maintained high.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in the limiting sense.

I claim:

1. In an air conditioning system which is adapted to provide heating and cooling for a plurality of zones which normally constitute different heating or cooling loads, the combination of a plurality of air treating units which are adapted to provide air to the respective zones, each of said units including a heat transfer coil through which air is passed to provide the heating or cooling of the air in accordance with the demand of that zone and means to direct air through said coil, refrigeration means including an evaporator and a main condenser, an auxiliary condenser connected in parallel with said main condenser, means to pass separate streams of water respectively through said evaporator and said main condenser and thence to the coil of each of said air treating units whereby the water flowing through said evaporator constitutes a supply of cold water for said coils and the water flowing through said main condenser constitutes a supply of hot water for said coils, a single water return line adapted to receive the water flowing through each of said coils and to return the water for recirculation through said evaporator and said main condenser, a cooling tower, and means to circulate water through said auxiliary condenser and thence through said cooling tower.

2. A system as described in claim 1 which includes a central control system which includes means to control the operation of said refrigeration means to maintain a predetermined temperature of the cold water flowing from said evaporator, and means to provide auxiliary heating for the water flowing from said main condenser.

3. A system as described in claim 2 which includes, control means for each of said units which supplies hot or cold water to the coil of that unit in accordance with the temperature of the air being discharged therefrom.

4. A system as described in claim 3 which includes, means to control the temperature of each conditioned zone in accordance with the outside temperature, and means to effect the changing of the temperature of the water flowing to the coil from the normally maintained temperature.

5. A system as described in claim 1 wherein each of said units includes, a controller responsive to the temperature of the air passing from the coil of that unit and adapted to supply hot or cold water to that coil, and means to increase the temperature of the hot water when there is an unsatisfied heating demand at any unit after the maximum amount of hot water is flowing through the coil of that unit.

6. A system as described in claim 1 which includes, a plurality of separate refrigeration systems each having a separate evaporator through which the stream of water flows to be cooled.

7. A system as described in claim 1, wherein each of said heat transfer coils is adapted to effect a reduction in the air temperature in the order of 20° to 25° F. during peak load conditions.

8. A system as described in claim 1, wherein each of said heat transfer coils provides substantially saturated air when there is a cooling load, and wherein said system includes volume control air outlets, and thermostatic means to control the air volume flowing to each zone under the control of the temperature within that zone.

9. In an air conditioning system of the character described, the combination of, refrigeration apparatus including a water-cooling evaporator through which water flows to provide a stream of cold water and a water-heating condenser through which water flows to provide a stream of hot water, said refrigeration apparatus also including a main condenser and means to cool refrigerant therein and to dissipate the heat in a heat sink, a plurality of air cooling and heating units poistioned respectively to cool or heat air in accordance with a demand, each of said units including a coil having a dimension in the direction of air flow to cool the air to a saturation temperature whereby air being cooled flows from the coil in substantially saturated condition, means to supply hot or cold water or a mixture of both from said streams to the coil of each of said units under the control of the temperature of the air flowing from the respective coils, and means to return the water from all of said coils in a single return stream for recirculation.

10. In an air conditioning system for a building in which different spaces have different air conditioning requirements, a separate air treating unit for each of the different spaces, means for flowing air through each air treating unit to the space serviced thereby, a central refrigeration system for chilling water, water flow lines forming a water circuit having a first branch line extending from said refrigeration system and connected to each of said air treating units for delivering chilled water thereto, a common return line for water from all of said units, a second branch line extending from said common return line connected to each of said air treating units for supplying returned water thereto, and a plurality of valves comprising valve means for each of said air treating units which is operated in response to a condition affected by its unit to regulate the flow of water from the separate branch lines to its unit thereby to treat air flowing therethrough in accordance with the requirements in the space serviced thereby.

11. An air conditioning system as described in claim 10 wherein each of said air treating units has a water coil for conditioning the air, wherein the air and water flow countercurrent through said coil, said coil having a depth in the direction of air flow to cool the air to within a few degrees of the temperature of the water entering the coil to deliver substantially saturated air from the unit, and said valve means supplies returned water to said coil in accordance with conditions in the space serviced by the unit to blend with the chilled water thereby to vary the saturation temperature of the air leaving the coil in accordance with requirements.

12. An air conditioning system as described in claim 10, which includes heating means for heating water in said second branch line flowing to the units.

13. An air conditioning system as described in claim 10, wherein said branch lines extending to each unit are joined to each other, and said valve means for each unit comprises a single valve assembly at the junction of the two branch lines for regulating the flow of chilled and returned water from the separate branch lines to the air treating unit.

14. An air conditioning system as described in claim 10, wherein said refrigeration system comprises a plurality of independent staged refrigeration units for successively chilling water to progressively lower temperatures.

15. An air conditioning system for a building having certain areas requiring heating at the same time that other areas require cooling, a separate air treating unit for each of said different areas, each of said air treating units having a heat exchange coil therein, lines connecting each of said coils to form a circuit for a heat exchange fluid, said circuit having a first branch connected to supply heating fluid to the coil of the air treating unit in each of said areas where heating is required and a second branch connected to supply cooling fluid to the coil of the air treating unit in each of said areas where cooling is required, a common return line connected to receive heat exchange fluid from the coils of all of said units and to supply the fluid to both of said branches, a circulator for circulating heat exchange fluid through both of said branches of said circuit to utilize the heat absorbed in the areas requiring cooling to heat the areas requiring heating, and a refrigeration system having a heat dissipating element in the first branch and a heat absorbing element in the second branch for additionally heating or cooling the heat exchange fluid as required.

16. An air conditioning system for a building having certain areas requiring heating and cooling, a separate air treating unit for each of said different areas, each of said air treating units having a heat exchange coil therein, lines connecting each of said coils to form a circuit for a heat exchange fluid, said circuit having a first branch connected to supply heating fluid to the coil of the air treating unit in each of said areas where heating is required and a second branch connected to supply cooling fluid to the coil of the air treating unit in each of said areas where cooling is required, a common return line connected to receive heat exchange fluid from the coils of all of said units and to supply the fluid to both of said branches, a circulator for circulating heat exchange fluid through both of said branches of said circuit, and a refrigeration system to cool the fluid in said second branch.

References Cited in the file of this patent

UNITED STATES PATENTS

| | | |
|---|---|---|
| 2,177,602 | Spaan | Oct. 24, 1939 |
| 2,292,335 | Durbin | Aug. 4, 1942 |